Patented May 4, 1948

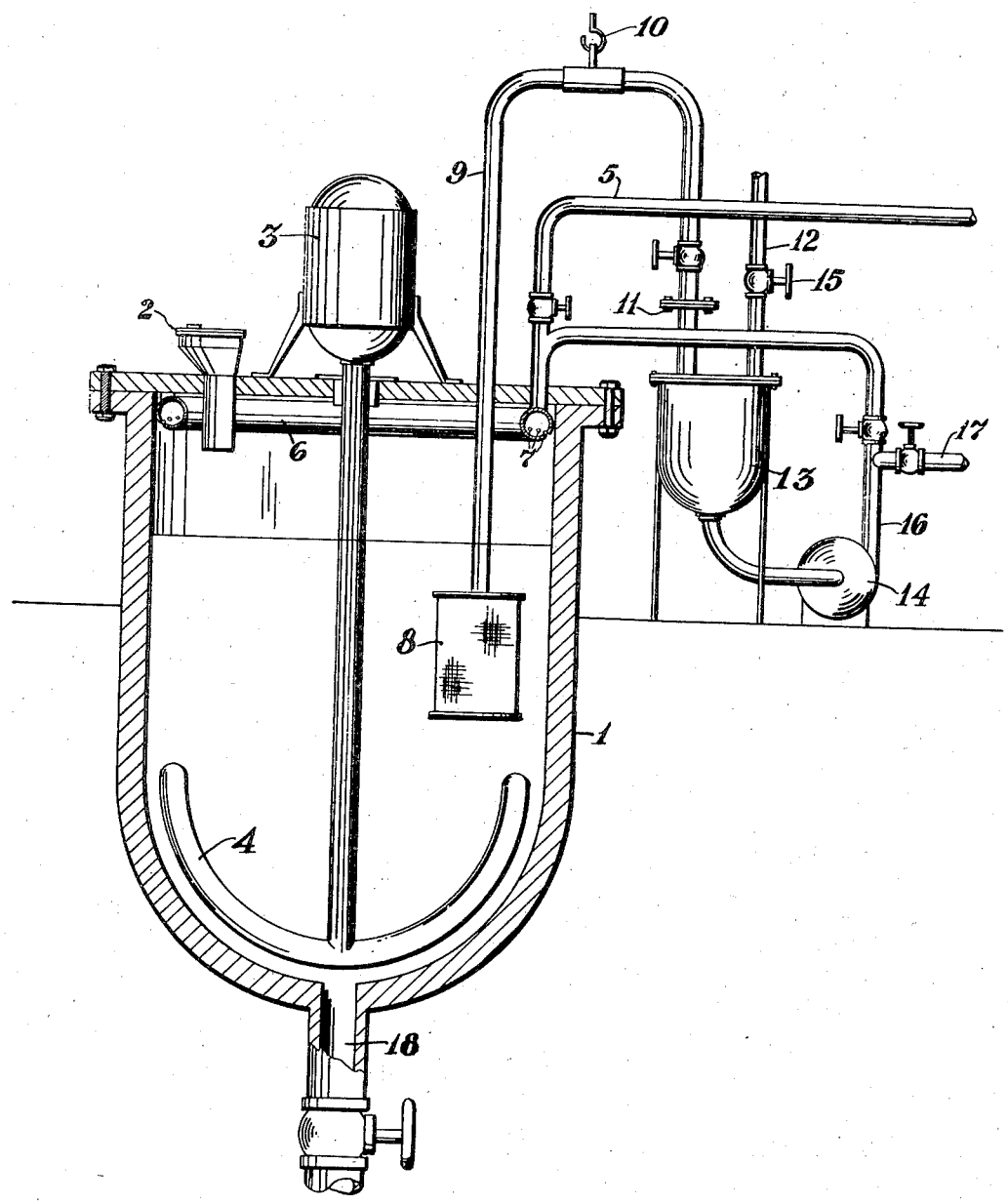

2,440,730

UNITED STATES PATENT OFFICE 2,440,730

PREPARATION OF POLYVINYL ACETAL RESINS

Gelu S. Stamatoff, Rutherford, N. J., assignor to E. I. du Pont de Nemours & Company, Wilmington, Del., a corporation of Delaware Application September 30, 1943, Serial No. 504,363

3 Claims. (Cl. 260—73)

This invention relates to the preparation of polyvinyl acetal resins and, more particularly, to the preparation of such resins by the condensation of polyvinyl alcohol and an aldehyde in an aqueous reaction medium in a condensation kettle.

The production of polyvinyl acetal resins, such as polyvinyl butyral, has been carried out heretofore in plant scale operations by the condensation of polyvinyl alcohol and an aldehyde, other than formaldehyde, in an aqueous reaction medium in a condensation kettle, the resin being precipitated from the reaction mixture as it forms. The resin is usually thoroughly washed and subjected to a stabilizing treatment before removal from the kettle. Such a process in an improved form is disclosed in United States patent application Serial No. 494,511, filed July 13, 1943, now Patent Number 2,400,957 issued May 28, 1946, in the name of G. S. Stamatoff.

In carrying out the preparation of resins according to the general process discussed above, considerable difficulty has been experienced with excessive resin adhesions on the walls of the condensation kettle. These adhesions resulted in non-uniform, high hydroxyl content, polyvinyl acetal resins due to the heterogeneous distribution of reactants during the reaction period. These adhesions of resin built up to agglomerations which broke off as large chunks which resulted in non-uniform particle size and a resin product of lower quality, i. e., the chunks of resin were usually insoluble due to their extended time of contact with the reactants. Therefore, it was found necessary to resort to frequent shut downs for the purpose of cleaning the reaction kettle and this resulted in a lower production rate.

An object of the present invention is to provide an improved process for the preparation of polyvinyl acetal resins wherein these resin adhesions are prevented and thereby the production of a high quality, uniform polyvinyl acetal resin is insured. A further object is to provide a process in which the production rate of polyvinyl acetal resin is increased. A more particular object is to provide an improved process for the production of polyvinyl butyral resin. Other objects will be apparent from the description of the invention given hereinafter.

The above objects are accomplished according to the present invention by preparing a polyvinyl acetal resin by the condensation of polyvinyl alcohol and an aldehyde containing at least 2 carbon atoms, in an aqueous reaction medium in a condensation kettle, the process being featured by the step which comprises directing a liquid against the internal walls of the reaction kettle adjacent the space in the kettle above the reaction mixture at a rate of at least one gallon per minute per foot of kettle periphery to form a continuous curtain of liquid on the internal walls of the kettle during the period commencing before any substantial precipitation of resin takes place in the reaction mixture and continuing thereafter throughout the whole time the precipitated resin is in the kettle, the liquid being water to the extent and during the stages of the process water is to be added to the reaction mixture and the liquid otherwise being recirculated reaction liquid.

The present invention comprises the discovery that, if a continuous curtain of liquid is maintained on the walls of the reaction kettle above the reaction mixture by forcing either water or recirculated reaction liquid through a circular sparger paralleling the walls of the kettle and provided with openings along its outer periphery so that the liquid is directed against the walls of the reaction kettle, or through equivalent means, the excessive adhesions of resin to the walls of the kettle were overcome, providing the rate of liquid forced through the sparger was greater than about one gallon per minute per foot of internal kettle periphery. If the rate of liquid forced through the sparger is appreciably below this minimum, the prevention of resin adhesions is substantially not apparent at all, hence, observation of this minimum rate is an essential part of the present invention.

Whether the liquid directed against the kettle walls is water, recirculated reaction liquid, or some aqueous solution used in stabilizing the resin, is immaterial in so far as preventing resin adhesions is concerned. On the other hand, it would not be feasible to dilute the reaction mixture indefinitely by running water in through the sparger and, therefore, recirculation of the reaction liquid is resorted to except at the times and to the extent water or other aqueous solution is to be added to the reaction mixture.

In carrying out the present invention, the curtain of liquid on the walls of the kettle should be maintained continuously from a point in the process before there is any permanent precipitation of resin, and thenceforth through condensation reaction, the washing of the resin, and, if any, the stabilization treatment of the resin, until the resin is removed from the kettle.

The invention will be more particularly described in the following example wherein all parts are given by weight unless otherwise noted, reference being made to the accompanying drawing in which the single figure is a side elevation, partly in section, of an apparatus adapted for carrying out the invention.

*Example*

A solution of polyvinyl alcohol is prepared as follows:

|  | Parts |
|---|---|
| Methyl alcohol | 800 |
| Polyvinyl alcohol | 800 |
| Water | 6800 | and its acid content is adjusted to 0.01%–0.02%, expressed as methyl sulfuric acid. Approximately 30% of the above charge is added as a so-called "heel" to the condensation kettle 1 through the inlet 2. Motor 3 driving agitator 4 is started to agitate this heel and remains in motion throughout the process. The remainder of the above charge is then fed into the kettle 1 together with 440 parts of butyraldehyde over a twenty minute period. Following this addition, there are added 3 parts of sulfuric acid.

5,000 parts of hot water, at 90° C.–92° C., entering through the inlet line 5, are forced through the sparger 6 into the reaction mixture at a rate of 60 gallons per minute, this amounting to 2.2 gallons per minute per foot of internal kettle wall periphery. The sparger 6 is circular in shape and parallels the side walls of kettle 1 adjacent the top of kettle 1, and is provided with openings 7 along its outer periphery to insure a continuous curtain of liquid on the internal walls of the kettle 1 extending above the reaction mixture. The diameter of the sparger 6 is somewhat exaggerated in the drawing for purposes of illustration. At the commencement of the introduction of the hot water, 200 parts of butyraldehyde are introduced into the kettle 1 substantially instantaneously through the inlet 2.

Immediately upon the completion of the addition of the hot water, the reaction mixture having reached a temperature of about 65° C.–68° C., the filter 8 and associated line 9 is lowered by winch 10 into the position shown in the drawing and coupling 11 is connected. A vacuum is then applied through the vacuum line 12 to the kettle 13 which is connected to the line 9 by coupling 11, to draw the reaction liquid from the kettle 1 through the filter 8 into the kettle 13. When kettle 13 has been approximately filled, pump 14 is started and circulation of the reaction liquid at a rate of 30 gallons per minute (1.1 gallons per minute per foot of kettle periphery) through the sparger 6 is begun. Valve 15 in the vacuum line 12 is then closed. The course of the reaction liquid is through the filter 8, line 9, kettle 13, pump 14, connecting line 16, and inlet line 5 to the sparger 6, the various lines being appropriately valved to control the flow.

Twenty minutes after the initiation of the recirculation of the reaction liquid, 2 parts of sodium hydroxide are added to the reaction mixture and twenty minutes later one part further of sodium hydroxide is added.

After fifty minutes of recirculation at the rates indicated, the recirculation is stopped and a withdrawal of the liquid at a rate of 30 gallons per minute is begun through pipe 17. Simultaneously, 30 gallons per minute (1.1 gallons per minute per foot of kettle periphery) of fresh water, at 65° C.–68° C., entering through pipe 5, is forced through the sparger 6 onto the walls of the kettle 1. This washing cycle continues for 30 minutes and at the end of that time recirculation of liquid from the kettle 1 to the sparger 6 and back to the kettle 1 is begun at a rate equal to or exceeding 30 gallons per minute.

The stabilization cycle follows and is accomplished by any one of the known procedures for this process. During the stabilization the liquid from the reaction mixture continues to be recirculated through the sparger at a rate of at least one gallon per minute per foot of kettle periphery in order to prevent adhesions. Upon the completion of the stabilization cycle the condensation kettle 1 is drained of its contents through the outlet 18. During the draining, fresh water is forced through the sparger 6 in order to wash the kettle walls free of adhering particles. Upon completion of the cycle, the kettle walls are substantially free of adhesions and the polyvinyl butyral resin obtained is uniform and of high quality such as is required in the manufacture of safety glass interlayers.

It will be understood that the above example is merely illustrative and the primary feature of the present invention, that is, the step of directing liquid against the walls of the kettle to form a continuous curtain of liquid, is broadly applicable to the preparation of polyvinyl acetal resins by the condensation of polyvinyl alcohol and an aldehyde containing at least 2 carbon atoms in a condensation kettle. While the specific procedure set forth in the example is a preferred one, those skilled in the art will appreciate that wide variations in the procedure may be adopted without departing from the scope of this invention.

The term "polyvinyl alcohol" has been used herein to denote one of the starting materials merely for the sake of simplicity. Actually the "polyvinyl alcohol" is the product of hydrolysis of a polyvinyl ester, usually polyvinyl acetate, and it is common to use the products of an incomplete, rather than of a complete, hydrolysis of the polyvinyl esters. Thus, the "polyvinyl alcohol" may contain, in its macromolecules, residues of unhydrolyzed vinyl acetate in amounts up to as much as 30%, but more usually, at least if the resin is to be used in safety glass interlayers, in amounts of the order of 0.5%–6.0%. While the particular composition of the polyvinyl alcohol may affect the properties of the finished polyvinyl acetal resin, it will be apparent that the present invention is equally applicable regardless of the composition of the polyvinyl alcohol.

The specific example describes the preparation of a polyvinyl butyral resin but the invention is applicable to the reaction product of polyvinyl alcohol with aldehydes containing more than 2 carbon atoms. Thus, acetaldehyde and propionaldehyde as well as other aldehydes may be used in place of butyraldehyde.

The particular form of apparatus shown in the drawing is especially well suited for carrying out the present invention although the process is independent of the apparatus except for, obviously, the condensation kettle which is conventionally used at any rate, some means for directing liquid against the walls of the kettle above the reaction mixture, and some means for recirculating the reaction liquid. While other means may be employed for the purpose, the sparger shown in the drawing has been found markedly superior to equivalent means that have been tried for directing the liquid against the walls of the condensation kettle. The prevention of the resin adhesions to the walls of the kettle has not been easily attained and it is necessary that a continuous curtain of liquid be formed on the walls, as is provided by a sparger of the design shown in the drawing, in addition to directing liquid against the walls at a rate of at least one gallon per minute per foot of kettle periphery. It is not essential for the curtain of liquid to start at a point higher on the walls of the kettle than that which will be contacted by the reaction mixture but, practically, it is preferred to position the sparger adjacent the top of the kettle to insure against all contingencies. Also, the provision of a strainer at the intake end of the line for recirculating the reaction liquid is advisable in order to prevent resin particles from gaining access to the recirculation system.

An outstanding advantage of the present invention is that it provides a practical way of producing polyvinyl acetal resins of high quality, that is, uniform as to particle size, hydroxyl content and solubility characteristics. A further outstanding advantage of the invention is that it provides a method of preparing polyvinyl acetal resins at a higher rate for a given installation than heretofore possible due to avoiding any necessity for frequent shut downs to clean the equipment.

As many apparently widely different embodiments of this invention may be made without departing from the spirit and scope thereof, it is to be understood that the invention is not limited to the specific embodiments thereof except as defined in the appended claims.

I claim:

1. In the process of preparing a polyvinyl acetal resin by the condensation of polyvinyl alcohol and an aldehyde from the group consisting of acetaldehyde, propionaldehyde, and butyraldehyde, in an aqueous reaction medium in a condensation kettle, the step which comprises directing an aqueous liquid against the internal walls of said kettle adjacent the space in said kettle above the reaction mixture at a rate of at least one gallon per minute per foot of kettle periphery to form a continuous current of liquid on said internal walls during the period commencing before any substantial precipitation of resin takes place in the reaction mixture and continuing thereafter throughout the whole time the precipitated resin is in said kettle, said liquid being recirculated reaction liquid to the extent required to avoid undesired dilution of the reaction liquid.

2. In the process of preparing a polyvinyl butyral resin by the condensation of polyvinyl alcohol and butyraldehyde in an aqueous reaction medium in a condensation kettle, the step which comprises directing an aqueous liquid against the internal walls of said kettle adjacent the space in said kettle above the reaction mixture at a rate of at least one gallon per minute per foot of kettle periphery to form a continuous curtain of liquid on said internal walls during the period commencing before any substantial precipitation of resin takes place in the reaction mixture and continuing thereafter throughout the whole time the precipitated resin is in said kettle, said liquid being recirculated reaction liquid to the extent required to avoid undesired dilution of the reaction liquid.

3. In the process of preparing a polyvinyl butyral resin by the condensation of polyvinyl alcohol and butyraldehyde in an aqueous reaction medium in a condensation kettle, the step which comprises forcing an aqueous liquid through a circular sparger positioned inside said kettle adjacent the top thereof and provided with openings along its outer periphery, against the internal walls of said kettle at a rate of at least one gallon per minute per foot of kettle periphery to form a continuous curtain of liquid on said internal walls during the period commencing before any substantial precipitation of resin takes place in the reaction mixture and continuing thereafter throughout the whole time the precipitated resin is in said kettle, said liquid being recirculated reaction liquid to the extent required to avoid undesired dilution of the reaction liquid.

GELU S. STAMATOFF.

REFERENCES CITED

The following references are of record in the file of this patent:

UNITED STATES PATENTS

| Number | Name | Date |
|---|---|---|
| 1,862,392 | Affleck | June 7, 1932 |
| 2,280,802 | Depew | Apr. 28, 1942 |
| 2,282,037 | Dahle | May 5, 1942 |